United States Patent [19]

Boaz

[11] Patent Number: 4,477,486
[45] Date of Patent: Oct. 16, 1984

[54] METHOD OF APPLYING AN OPAQUE SCREENING AREA

[75] Inventor: Premakaran T. Boaz, Livonia, Mich.

[73] Assignee: Ford Motor Company, Dearborn, Mich.

[21] Appl. No.: 579,300

[22] Filed: Feb. 16, 1984

Related U.S. Application Data

[63] Continuation-in-part of Ser. No. 356,000, Mar. 8, 1982, abandoned.

[51] Int. Cl.³ .......................... B05D 3/02; B05D 5/00
[52] U.S. Cl. .................................. 427/54.1; 427/259; 427/264; 427/266; 427/284
[58] Field of Search ............ 427/259, 266, 272, 126.2, 427/284, 54.1, 264

[56] References Cited

U.S. PATENT DOCUMENTS

| | | | |
|---|---|---|---|
| 3,061,476 | 10/1962 | Miserocchi | 427/126.2 X |
| 3,551,176 | 12/1970 | Hlista | 427/272 |
| 4,270,985 | 6/1981 | Lipson et al. | 427/259 X |
| 4,300,933 | 11/1981 | Thomas | 427/272 X |

Primary Examiner—Evan K. Lawrence
Attorney, Agent, or Firm—William E. Johnson; Olin B. Johnson

[57] ABSTRACT

The disclosed method is one for applying an opaque screening area (46) to a surface of a glass sheet (40). The method is initiated by applying to the surface of the glass sheet a masking material (42) which defines the edges of the opaque screening area. The masking material is nonreactive with the glass surface and is heat decomposable into products which can be removed from the glass surface without damage thereto. The masking material extends away from the defined edges of the opaque screening area to provide a wide area of masking material. A ceramic-containing material is applied on areas of the surface of the glass sheet to which the opaque screening areas are to be applied. The ceramic-containing material also coats at least a part of the masking material. The glass sheet is heated to decompose the masking material so that it and any ceramic material overlying it can be removed from the surface of the glass sheet and to heat fuse the fusable components of the ceramic material to the surface of the glass sheet thereby to form the opaque screening area. The decomposed masking material and any ceramic material overlying it are removed from the glass sheet so that the opaque screening area is defined by a sharp edge which had been defined by the masking material before its removal.

3 Claims, 8 Drawing Figures

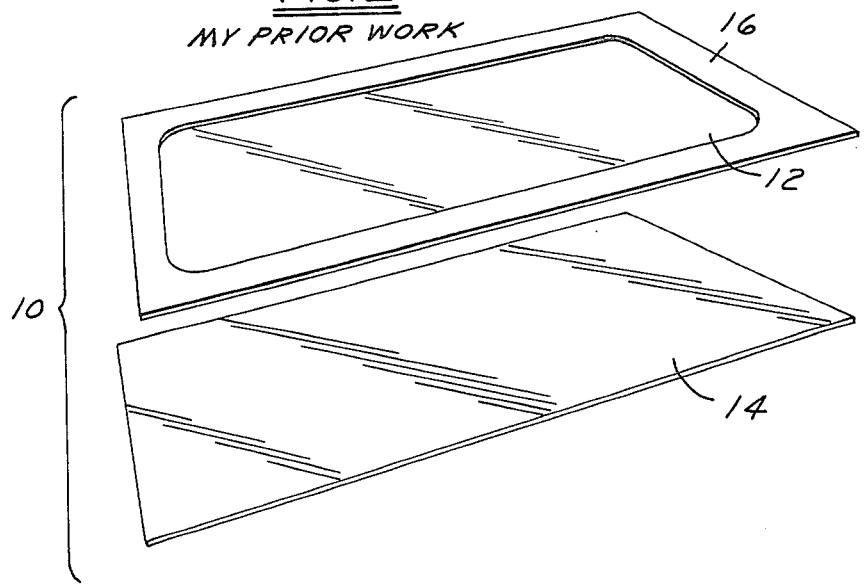
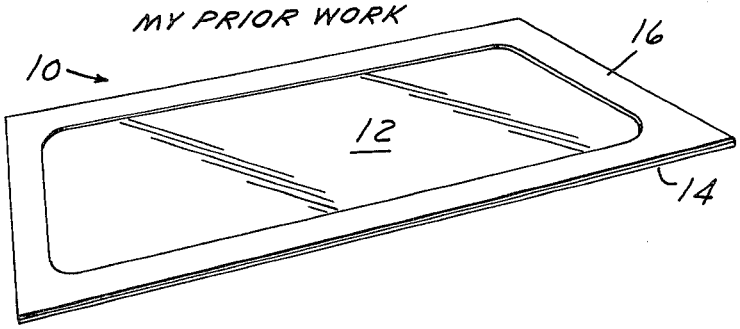
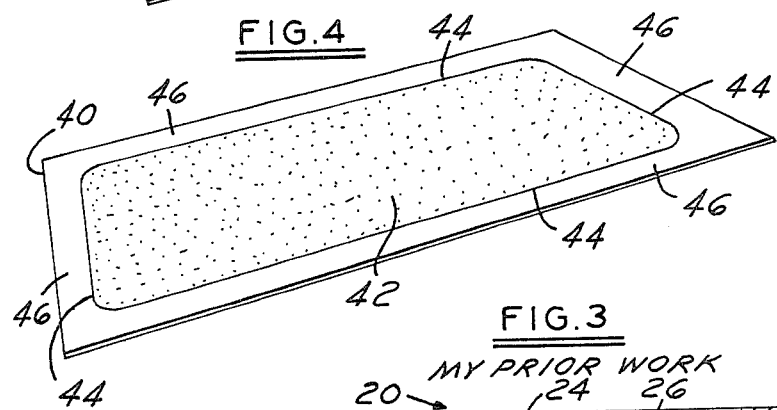
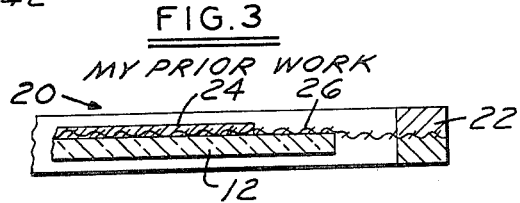

METHOD OF APPLYING AN OPAQUE SCREENING AREA

This application is a continuation-in-part of application Ser. No. 356,000, filed Mar. 8, 1982, now abandoned.

TECHNICAL FIELD

This invention relates to a method of applying an opaque screening area to a surface of a glass sheet. In particular, the method is used to apply an opaque screening area to glass sheets which are subsequently used as windshields or backlites in vehicles so that certain portions of the viewing area through the glass sheet is rendered opaque. In this manner, certain interior structure of the vehicle is not visible through the glass sheet when one is looking through the glass sheet from the exterior of the vehicle.

BACKGROUND ART AND PRIOR ART STATEMENT

No search was conducted on the subject matter of this disclosure in the U.S. Patent and Trademark Office or in any other search facility. I am unaware of any prior art which is relevant to the subject matter disclosed and claimed in this specification.

In FIGS. 1, 2 and 3 there is illustrated a method by which I attempted to obtain an opaque screening area on the surface of a glass sheet. This particular process, however, failed for reasons which will be set out in greater detail hereinbelow.

In FIG. 1 there is seen a windshield construction prior to lamination generally identified by the numeral 10. This construction is formed of an inner glass sheet 12 and an outer glass sheet 14. The inner glass sheet 12 has an opaque screening area 16 extending around the entire perimeter thereof. The thickness of this screening area is exaggerated in the figures so that it is more readily viewable. In actuality the thickness of the screening area is about 0.001–0.002 inches.

The opaque screening area is formed by applying an opaque ceramic-containing paste in the desired pattern to the inner glass sheet 12. Thereafter, the glass sheet is heated, as, for example, in a glass bending or tempering operation, which heating causes components of the ceramic paste to react and bond themselves to the glass surface of the inner glass sheet, thereby to form the opaque screening area 16 fully bonded to the glass.

FIG. 2 shows a completed windshield construction 10 in which the inner glass sheet 12 and the outer glass sheet 14 have been laminated together by a suitable laminating interlayer in a laminating operation well known to the skilled artisan. Since laminating of glass sheets is well known, no further discussion thereof will be undertaken herein. However, the operation does provide a windshield construction which has the opaque screening area 16 extending around the entire perimeter thereof.

The opaque screening area is used to block the view of certain interior portions of a motor vehicle from the exterior of that vehicle. For example, when the windshield construction 10 is installed in a motor vehicle, the lower portion of the opaque screening area 16, that portion at the bottom of the installed windshield, generally blocks the view from the exterior of the vehicle into the area below the instrument panel of the vehicle.

In a similar manner, from inside the vehicle, the lower portion of the opaque screening area 16 blocks any front seat passenger's view of the interior of the engine compartment, which otherwise could be seen through the lower portion of the installed windshield. The side portions and upper portion of the opaque screening area 16 are effective in blocking a view of the clips and assembling devices used to fasten windshield moldings and headlinings to the interior of the motor vehicle.

Thus the opaque screening area 16 provides a means by which certain unsightly portions of the construction of the vehicle are blocked from view from persons either within or without the vehicle.

As is best understood by reference to FIG. 3, I initially attempted to develop a method of applying the ceramic-containing paste for making the opaque screening area 16 on the inner glass sheet 12 of the windshield construction in a direct silk screen printing operation. In such a case, a silk screen printing device, generally identified by the numeral 20 in FIG. 3, contained a silk screen mounted in a frame 22, the silk screen having an emulsion-containing portion 24 and a nonemulsion-containing portion 26. As is well understood in the art, the nonemulsion-containing portion of the silk screen is that portion of the screen through which paste-like materials may be printed on a surface disposed thereinbelow.

Since I was operating at the edge of the glass sheet in order to directly print the opaque screening area 16 along the perimeter of the inner glass sheet 12, I soon found that the sharp edge along the perimeter of the glass sheet rapidly abraded the nonemulsion-containing portion 26 of the silk screen, thereby rendering the silk screen useless. The abrasion would occur in less than ten printing operations, which made the entire process extremely expensive due to the high cost of continually preparing silk screens. In normal applications, silk screens should be available for use in a printing operation at least five thousand times.

In view of my initial failure in this area, I looked for a new manner of developing the opaque screening area about the perimeter of a glass sheet which is to be used subsequently, for example, in a motor vehicle.

It is a principal object of the method of this invention to apply an opaque screening area to a surface of a glass sheet in a manner which is economical to carry out and efficient in operation.

DISCLOSURE OF THE INVENTION

This invention relates to a method of applying an opaque screening area to a surface of a glass sheet, and, more particularly, to a method of applying an opaque screening area to a surface of a glass sheet which is subsequently used in a vehicle, the opaque screening area providing a screen to block out the view of certain mechanical portions or assembly devices employed in that vehicle.

My method of applying an opaque screening area to a surface of a glass sheet is characterized in that the method has the following steps.

The method is initiated by applying to the surface of the glass sheet a masking material which defines the edges of the opaque screening area to be applied to that glass sheet. The masking material is one which is nonreactive with the surface of the glass sheet. Also, the masking material is a material which is heat decomposable into products which can be removed from the surface of the glass sheet without damage thereto. The masking material is applied to the surface of the glass sheet in a manner which provides a wide area of masking material extending away from the defined edges of the opaque screening area to be applied to the glass sheet. In its preferred embodiment, the masking material is applied in a silk screen printing operation in which nonemulsion-containing portions of the silk screen do not overlie edges of the glass sheet which may abraid the same.

A ceramic-containing material is applied, as, for example, in a spraying operation, on the areas of the surface of the glass sheet to which the opaque screening areas are to be applied. The ceramic-containing material also coats at least part of the masking material generally along the portion of the masking material defining the edges of the opaque screening area. The ceramic-containing material contains components which are heat fusable to the surface of the glass sheet to form the opaque screening area.

The glass sheet is heated to carry out at least two operations. One operation is to decompose the masking material so that it and any ceramic material overlying it can be removed from the surface of the glass sheet without any damage thereto. The second operation is that of heat fusing the heat fusable components of the ceramic material to the surface of the glass sheet, thereby to form the opaque screening area on the surface of the glass sheet.

The decomposed masking material and any ceramic material overlying the same is removed. In this manner, the opaque screening area is defined by a sharp edge which has been defined by the masking material before its removal.

In alternate forms of the method of this invention, the heating of the glass sheet may also be to a temperature sufficient so that the glass sheet may be rapidly quenched therefrom in order to temper the same. Such an operation would normally be carried out on a backlite which is formed from a single sheet of tempered glass.

If it was desired to manufacture a windshield, the heating operation would also be associated with a bending operation in which both the inner and outer glass sheets forming the windshield construction are bent in a single fixture at the same time in a manner well known to the skilled artisan. After bending and annealing of such a pair of glass sheets, they would be laminated together in a normal laminating operation in order to form the finished windshield construction.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like characters indicate like parts throughout the several figures, and in which:

FIGS. 1, 2 and 3 generally disclose my prior work in this area which was described in detail in the Background Art and Prior Art Statement portion of this specification; and FIGS. 4, 5, 6, 7 and 8 are schematic representations of the steps carried out in accordance with a preferred embodiment of the method of my invention to apply an opaque screening area to a surface of a glass sheet; the preferred embodiment being illustrated for the manufacture of a windshield construction having an opaque screening area extending its entire perimeter, as will become more apparent in the subsequent portions of this specification.

BEST MODE AND INDUSTRIAL APPLICABILITY

Figure 5:
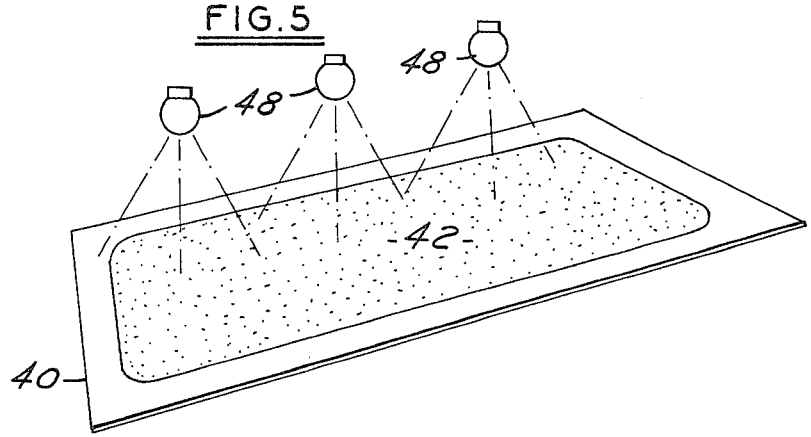

The following description is what I consider to be a preferred embodiment of my method of applying an opaque screening area to a surface of a glass sheet. The following description also sets forth what I now contemplate to be the best mode of carrying out the method of this invention. This description is not intended to be a limitation upon the broader principles of this method, and while preferred materials are used to illustrate the method in accordance with the requirements of the law, it does not mean that the method is operative only with the stated materials, as others may be substituted therefor. Also, for example, the method disclosed herein may be successfully used with materials yet to be developed by skilled artisans such as new masking materials or ceramic-containing materials for forming opaque screening areas.

It is therefore contemplated by me that the method disclosed in this specification may also be successfully used with materials which are yet to be developed because the principles of operation of the method remain the same, regardless of the particular material subjected to the method or used with the method.

The method of applying an opaque screening area to a surface of a glass sheet, in accordance with the teachings of a preferred embodiment, is initiated by applying to the surface of a glass sheet 40 a masking material 42 (this is best seen in FIG. 4). The glass sheet 40 may serve as the inner glass sheet for a windshield construction, which will be described in greater detail hereinbelow. In accordance with the teachings of the preferred embodiment, the masking material covers all the central area of the glass sheet 40, thereby to define a continuous edge 44 around the perimeter of the masking material 42, which in turn defines the continuous edge of where an opaque screening area 46 is to be applied to the glass sheet. The area for the opaque screening area 46 lies between the continuous edge 44 of the masking material 42 and the edges of the glass sheet.

The masking material is one which is nonreactive with the surface of the glass sheet at any time during and after the application thereof. The masking material 42 also is one which is heat decomposable into products which can be removed from the surface of the glass sheet without damage thereto. A suitable masking material is 20-1316 made by Drakenfeld of Washington, Pa. This material is a powder which is then mixed with components such as CUP 9009 resin made by Advance Company of Chicago, Ill., which is an ultraviolet radiation curable material. As stated above, the masking material is one which is nonreactive with the surface of the glass sheet and also one which is heat decomposable into products which can be removed from the surface of the glass sheet. The suitable masking material was illustrated above by being made from components including an aluminum hydrate powder, sold by Drakenfeld, mixed with an ultraviolet radiation curable material, sold by Advanced Company. As is readily apparent to any skilled artisan, the above named components are not the only components which may be used to form the masking material. As long as the mixture of components is one which produces a masking material which is nonreactive with the surface of the glass sheet at any time during and after application thereof and is also one which is heat decomposable into products which can be removed from the glass sheet without damage thereto, the mixture will make a suitable masking material.

Generally masking materials are formed of two components, one being a refractory powder ground to a sufficiently fine state that the ground powder can pass through a normal silk screen printing device, and the other being an ultraviolet radiation curable material. With respect to the refractory powder, normal mesh size of a silk screen printing device is in the range of 230 mesh and the refractory powder must be fine enough to pass through such a mesh. If the refractory powder has a size of 350 mesh or less, it is suitable for printing through a normal silk screen. Suitable refractory materials include aluminum oxide, aluminum hydrate, calcium carbonate, zirconium oxide, silicon dioxide, silicates and other materials which are generally nonreactive with the surface of glass when placed thereon and heated to temperatures which are encountered in normal glass tempering operations. Normally the refractory powder makes up 90-60% by weight of the total weight of the masking material.

The other component of the masking material is the ultraviolet curable resin vehicle. This resin is normally a liquid which is mixed with the refractory powder in order to make a suitable paste which may be printed through a silk screen printing device. Skilled artisans are aware of the many hundreds of ultraviolet curable resins. Generally these resins have cross-linking positions which are cross linked when subjected to ultraviolet radiation in order to set up the resin and thereby lock the entire masking material in a fixed position. The ultraviolet curable vehicle is an organic material and, as such, when it is subjected to heat such as in a tempering operation, it burns away. When the ultraviolet curable material has burned away, the fine refractory powder previously contained therein is left behind and it may be blown off the glass sheet as described in a later portion of this specification.

Therefore, while a single refractory powder and a single ultraviolet curable resin are mentioned above as a preferred embodiment of the method of my invention, a myriad of combinations of different refractory powders and ultraviolet curable vehicles are well known to the skilled artisan, and any selection or combination of these materials may be successfully used in my method so long as the desired characteristics of the masking material are achieved. Those desired characteristics are, of course, that the masking material is nonreactive with the surface of the glass sheet at any time during and after application of the masking material to the glass sheet and that the masking material be heat decomposable into products which can be removed from the surface of the glass sheet without damage thereto.

Thus, in accordance with a preferred embodiment of the method of my invention, the masking material 42 (as seen in FIG. 5) is cured by the application of ultraviolet radiation thereto. As shown in FIG. 5, the glass sheet 40, with the masking material 42 supported thereon, is passed under a plurality of UV lamps 48—48. These lamps cause the UV curable components of the masking material to cure, whereby the masking material is temporarily bonded to the surface of the glass sheet in the manner desired.

Figure 6:
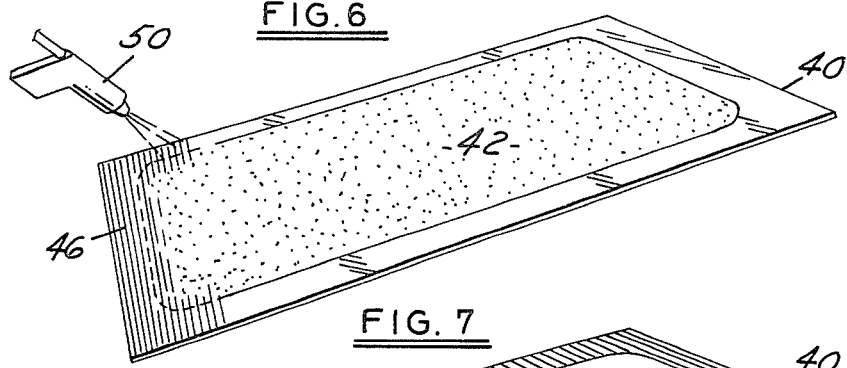

The next step in the method is the step of applying a ceramic-containing material such as a ceramic-containing paint on the areas of the surface of the glass sheet 46 which are to have the opaque screening area 46 applied thereto. As shown in FIG. 6, the ceramic-containing paint can be applied through a suitable spraygun 50 in a manner so that it covers the area 46 to which it is desired to apply the opaque screening material. As is shown in FIG. 6, some of the material is applied to the desired area and some of the material is also sprayed over the masking material 42.

Figure 7:
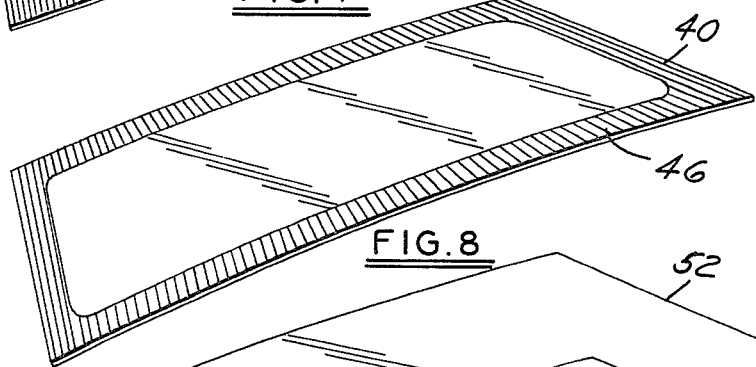
Figure 8:
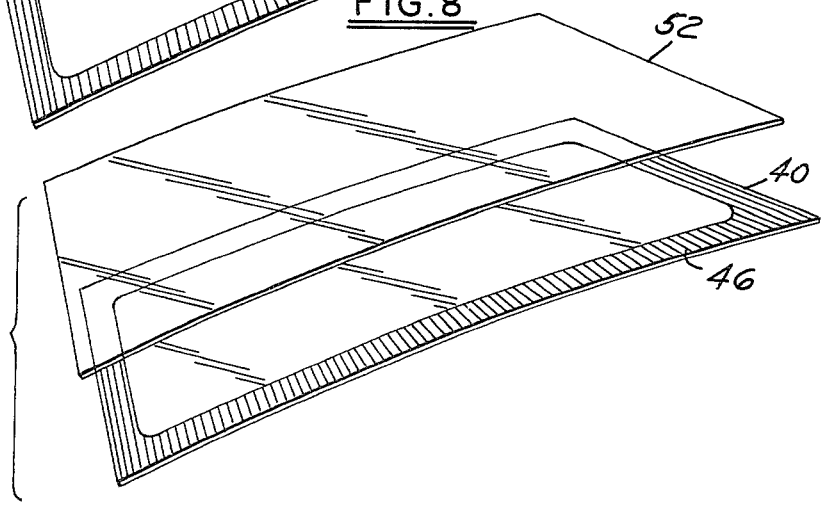

The processing of the glass sheet 40 now varies, depending upon whether or not it is going to be manufactured into a backlite or into a windshield. In FIG. 7, there is illustrated the situation in which the glass sheet 40 is to be made into a backlite. In this case, the glass sheet is passed through a tempering lehr in which it is heated to a temperature sufficiently high so that when the glass sheet is subsequently quenched from that high temperature the glass sheet will be tempered. Since a tempering operation is well known in the art, no further discussion thereof will be undertaken herein.

In this case, the heating of the glass sheet to the temperature for tempering carries out two additional functions besides heating the sheet. The heating decomposes the masking material 42 so that it and any of the ceramic paint overlying it can be removed from the surface of the glass sheet without any damage to the surface of the glass sheet. The heat decomposition of the masking material takes place basically because the binder for the masking material is a heat decomposable organic resin. The heating action also fuses the fusable components of the ceramic paint to the surface of the glass sheet, thereby to form the opaque screening area in the area 46 around the perimeter of the glass sheet. After the quenching operation, any masking material which has not been blown away in the quenching operation may be removed, for example, by washing the glass sheet. In general, however, the quenching operation is sufficient to blow away the residue of the masking material and any ceramic paint in contact therewith, thereby leaving behind the clearly defined opaque screening area.

If one desires to manufacture a windshield, the glass sheet 40 is paired with a second glass sheet 52 and the two sheets are simultaneously bent to the desired configuration in a bending furnace. During the passage of the glass sheet 40 through the bending furnace, the heat therein is sufficiently high to decompose the masking material so that it may be removed and to heat fuse the fusable components of the ceramic paint to the surface of the glass sheet to form the opaque screening area in the area 46 provided therefor. After bending and annealing of the glass sheets, the glass sheets are washed, at which time all of the decomposed masking material and ceramic paint overlying the same are removed from the glass sheet 40. The pair of glass sheets then have a plastic interlayer material placed therebetween, as is well known in the art, and subjected to a laminating operation in order to provide a finished windshield in a manner well known to skilled artisans.

While particular embodiments of the invention have been illustrated and described, it will be obvious to those skilled in the art that various changes and modifications may be made without departing from the invention, and it is intended in the appended claims all such modifications and equivalents as fall within the true spirit and scope of this invention.

I claim:

1. A method of applying an opaque screening area to a surface of a glass sheet characterized in that the method has the following steps:

applying to the surface of the glass sheet a masking material which defines the edges of the opaque screening area to be applied to the glass sheet, said masking material being nonreactive with the surface of the glass sheet and being heat decomposable into products which can be removed from the surface of the glass sheet without damage thereto, said masking material being applied to the surface of the glass sheet to provide a wide area of masking material extending away from said defined edges of the opaque screening area to be applied to the glass sheet;

applying a ceramic-containing material on the areas of the surface of the glass sheet to which the opaque screening areas are to be applied, said ceramic-containing material also coating at least part of said masking material generally along said portion of said masking material defining said edges of the opaque screening area, said ceramic material containing components which are heat fusable to the surface of the glass sheet to form the opaque screening area;

heating the glass sheet to (1) decompose said masking material so that it and any ceramic material overlying it can be removed from the surface of the glass sheet without any damage thereto, and (2) heat fuse said fusable components of said ceramic material to the surface of the glass sheet thereby to form the opaque screening area on the surface of the glass sheet; and removing said decomposed masking material and any ceramic material overlying the same whereby the opaque screening material is defined by a sharp edge which had been defined by said masking material before removal thereof.

2. A method of applying an opaque screening area to a surface of a glass sheet characterized in that the method has the following steps:

applying to the surface of the glass sheet a radiation curable masking material which defines the edges of the opaque screening area to be applied to the glass sheet, said masking material being nonreactive with the surface of the glass sheet and being heat decomposable into products which can be removed from the surface of the glass sheet without damage thereto, said masking material being applied to the surface of the glass sheet to provide a wide area of masking material extending away from said defined edges of the opaque screening area to be applied to the glass sheet;

curing said radiation curable masking material by applying curing radiation thereto thereby to form said area of masking material;

applying a ceramic-containing material on the areas of the surface of the glass sheet to which the opaque screening areas are to be applied, said ceramic-containing material also coating at least part of said masking material generally along said portion of said masking material defining said edges of the opaque screening area, said ceramic material containing components which are heat fusable to the surface of the glass sheet to form the opaque screening area;

heating the glass sheet to (1) decompose said masking material so that it and any ceramic material overlying it can be removed from the surface of the glass sheet without any damage thereto, and (2) heat fuse said fusable components of said ceramic material to the surface of the glass sheet thereby to form the opaque screening area on the surface of the glass sheet; and removing said decomposed masking material and any ceramic material overlying the same whereby the opaque screening material is defined by a sharp edge which had been defined by said masking material before removal thereof.

3. The method of claim 2, in which said radiation curable masking material is a UV curable material and UV light is applied thereto to cure the same.

* * * * *